April 10, 1928.  
C. H. LA MOTTE  
PIPE CUTTER  
Filed June 21, 1926  
1,665,212

Inventor  
Charles H. LaMotte  
by H. J. S. Dennison  
atty.

Patented Apr. 10, 1928.

1,665,212

UNITED STATES PATENT OFFICE.

CHARLES H. LA MOTTE, OF SOUTH PORCUPINE, ONTARIO, CANADA.

PIPE CUTTER.

Application filed June 21, 1926. Serial No. 117,420.

The principal object of the invention is to facilitate the work of cutting cast iron pipes or those which are composed of material of a similar crystalline character.

A further object is to provide a device which will accomplish the desired result in a very rapid yet highly efficient manner.

A still further object is to provide a device which may be used in restricted quarters, will be extremely simple to operate and which by reason of its compact character may be handled with unusual ease.

The principal feature consists in providing an annular yoke formed of separable sections adapted to be closed around a pipe and having sharp chisel-edged members extending inwardly therefrom presenting a substantially continuous circular edge which is forced into pressure contact with the outer surface of the pipe and forms a fracture line around its perimeter.

In the drawings, Figure 1 is an elevational view showing the complete device in a closed position.

Figure 2:
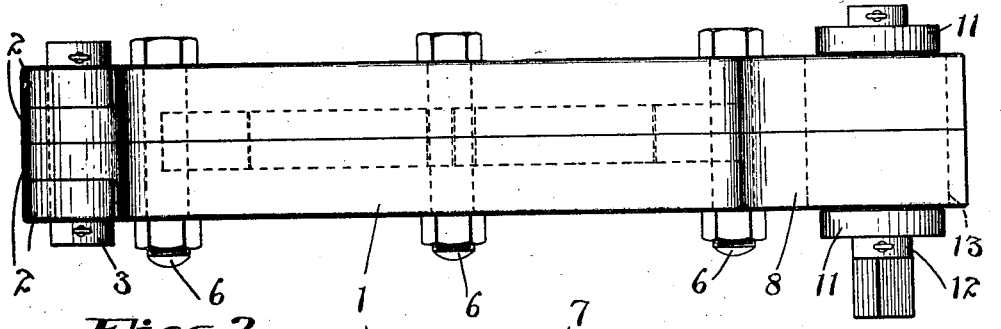
Figure 2 is a plan view of the device illustrated in Figure 1.

The cutting of cast iron pipes to suitable lengths has usually required considerable time and labour on the part of the workmen since it was necessary to rotate a cumbersome cutter head around the pipe in order to cut through its wall.

Very often hard spots or chilled sections in the texture of the pipe were encountered which rendered the cutter useless and the work was accordingly delayed, or other improvised methods were resorted to which offered small assurance of obtaining the desired results.

The present device has been constructed with a view to entirely eliminating the above difficulties by varying the principle employed from that of severing the pipe by cutters to a device which is adapted to receive a sharp blow, the shock of which is imparted directly to the pipe in a concentrated manner, being confined to a line of zero width continuous with the periphery thereof.

In the construction of the device herein shown a pair of semi-circular yoke members 1 are provided which are formed with lugs 2 through which a pin 3 passes to provide a pivotal connection between the two members 1 to permit them to be swung apart to allow the yoke to encircle the pipe.

Each of the members 1 is preferably formed as shown from two separate members, the meeting faces of which are provided with a recess 4 which is preferably undercut as shown in order to receive the base portion of the segmental blade sections 5, which blades increase in width toward the base. Bolts 6 are passed through the members 1 securely binding the sections together and confining the blade sections 5 therebetween, the base of the segmental blades 5 fitting snugly within the recess 4, the undercut walls of which engage and lock the individual blade sections in place.

Notches 7 are formed in the base portion of the blade sections to clear the bolts 6 and effectively prevent circumferential movement of the blades.

Figure 1:
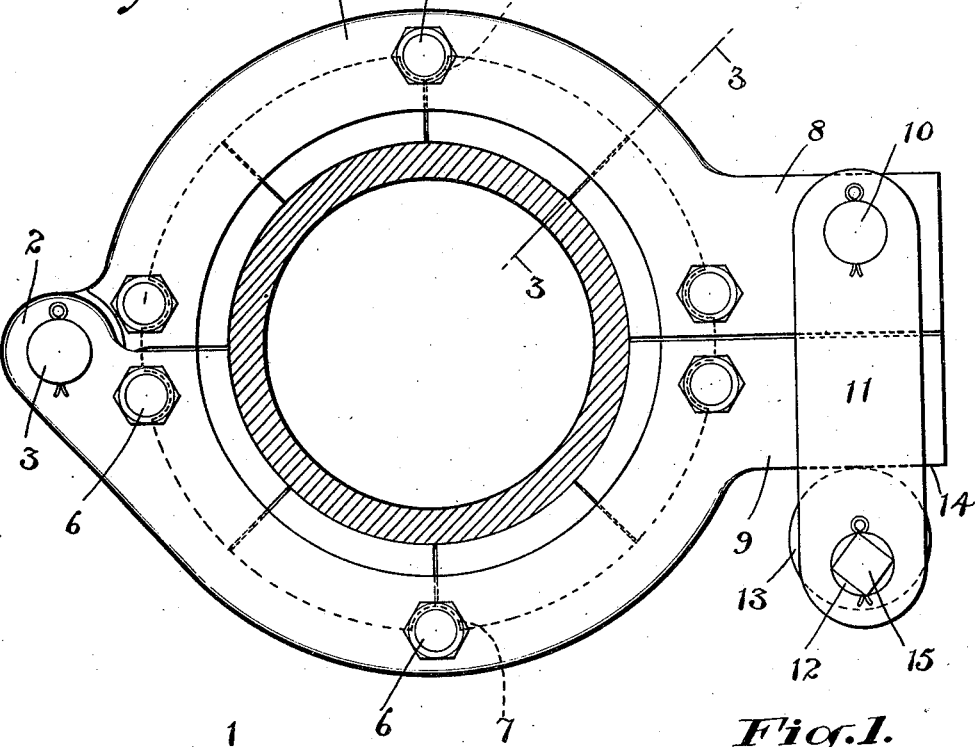
Figure 3:
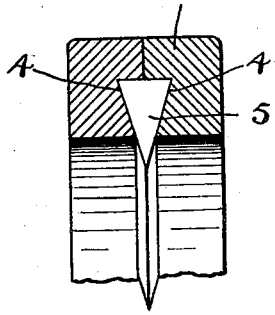
Figure 3 is a sectional detail taken on the line 3—3 of Figure 1 showing the arrangement of the sharp chisel-edged blade members and the manner in which they are secured in the yoke members.

When the blades are thus secured in position and the device is closed around a pipe, as shown in Figure 1, of the drawings, the apex or edges of all of the cutter segments will conform to provide a sharp and substantially continuous circular edge.

Heavy lug extensions 8 and 9 are formed on the members 1 on the side opposite the pivot lugs 2.

A pin 10 is inserted through the lug 8 and extends therebeyond at each side and receives the link members 11 which extend past the lug 9 and have mounted there between a rotatable spindle 12 on which is rigidly secured the eccentric cam member 13. The cam 13 engages the underside 14 of the lug 9 and upon being rotated it forces the members 1 together.

When it is desired to cut a pipe, the link members 11 are released and swung clear of the lug 9 and the members 1 are then swung apart, passed around the pipe and then closed together and the links 11 are swung back over the lug 9. The cam member 13 is then rotated by means of a wrench applied to the squared end 15 of the spindle 12 to which the cam is secured.

As the cam is rotated, it engages the outer side 14 of the lug 9, forcing the members 1 together and causing the conforming edges of the cutter members to be forced into intimate engagement with the outer surface of the pipe and causing the sharp edges of the cutter members to bite very slightly into the hard outer skin of the pipe.

This operation having been completed, the members 1 are then struck a sharp blow on their outer periphery with a hammer or sledge, and the shock being imparted to the pipe through the sharp edges of the cutter members only, is concentrated on the pipe in a line of zero width around the periphery, and results in the breaking or severing of the pipe in a clean fracture.

Such a device is particularly adaptable for use in cutting pipes, having a crystalline structure such as cast metal or tile, the results have been highly successful and a clean, accurate break in the pipe is assured.

In practice the members 1 of the device are preferably drop forgings or they may be cast from malleable stock in order that they may be sufficiently strong to resist the impact without breakage when struck by the hammer or sledge.

The cutter blades are formed in short sections to avoid breakage and are suitably hardened and tempered in order to preserve their sharp cutting edge.

The device can be constructed to any size in order to accommodate the various sizes of pipe, and its extremely rugged character will ensure long continued service.

It will of course be understood that various changes may be made in the structure of the device while still residing within the scope of the invention, it being possible to secure the cutter blades in the device in various ways.

It will be at once apparent that a device such as described may be employed in very restricted quarters and that a very material saving of time will be effected by its use.

What I claim as my invention is:—

1. A pipe cutter comprising a pipe-encircling member of circular form, means for constricting said member around a pipe, and sharp blades carried by said encircling member adapted upon the constriction of the latter member to present a circumferential edge in rigid contact continuous with the periphery of the pipe.

2. A pipe cutter, comprising a separable pipe-encircling member, means for securing said member in a closed position around the pipe, and sharp cutting blades carried by said pipe-encircling member adapted upon the securing of the latter member in its closed position to present a circumferential edge in rigid engagement continuous with the periphery of the pipe.

3. A pipe cutter, comprising a pair of separable yoke members each having a series of segmental cutter blades secured thereto and extending inwardly therefrom and forming a substantially continuous circular edge, and means for forcing said yoke members together to cause the edge of said cutter blades to engage the surface of the pipe in pressure contact.

4. A pipe cutter comprising, a pair of semi-circular yoke members pivoted together at one side and having a series of segmental cutter blades secured thereto and extending inwardly therefrom and forming a substantially continuous circular edge, a lug extending outwardly from each of said yoke members on the side opposite the pivot, means pivoted at one end to one of said lugs and embracing the other lug, and a cam member rotatably mounted in said pivotal means and adapted to engage the latter lug when rotated to force said yoke members together.

5. In a pipe cutter, a yoke member formed of a pair of semi-circular members pivotally connected together at one side, each member being formed of two sections, undercut recesses in the adjoining faces of said yoke forming sections, segmental blade members having their bases conforming to and arranged in said recesses and having sharp cutting edges adapted to engage and conform to the perimeter of the pipe, and bolts passing through and securing said sections together and maintaining said segmental blades in said recesses.

CHARLES H. LA MOTTE.